United States Patent [19]

Barbour et al.

[11] Patent Number: 5,272,992
[45] Date of Patent: Dec. 28, 1993

[54] INJECTION APPARATUS FOR INJECTING SLURRIES/LIQUIDS INTO THE GROUND

[75] Inventors: Richard S. Barbour, Banbridge; Samuel J. Weatherup, Ballynure, both of Ireland

[73] Assignee: Greentrac Limited, United Kingdom

[21] Appl. No.: 904,391

[22] Filed: Jun. 25, 1992

[30] Foreign Application Priority Data

Jun. 26, 1991 [GB] United Kingdom ................. 9113736

[51] Int. Cl.$^5$ .............................................. A01C 23/00
[52] U.S. Cl. .................... 111/120; 137/625.11; 251/118; 251/208; 239/655
[58] Field of Search ........... 141/231, 236, 248; 137/625.11; 251/118, 208, 209; 111/118, 120, 127, 128, 129, 123, 200, 175, 177; 222/236, 410; 239/662, 655, 567, 581.1

[56] References Cited

U.S. PATENT DOCUMENTS

| | | | |
|---|---|---|---|
| 3,995,494 | 12/1976 | Muller et al. | 137/625.11 X |
| 4,604,093 | 8/1986 | Brown et al. | 137/625.11 X |
| 4,677,921 | 7/1987 | Brown | 111/128 |
| 5,046,522 | 9/1991 | Le Dereh et al. | 137/625.11 X |

FOREIGN PATENT DOCUMENTS 0383633 2/1990 European Pat. Off. .

Primary Examiner—Clifford D. Crowder
Assistant Examiner—Paul C. Lewis
Attorney, Agent, or Firm—Kinney & Lange

[57] ABSTRACT

The disclosure relates to an apparatus for injecting slurry/liquid into the ground comprising a chassis (11, 12), a plurality of injectors (39) mounted on the chassis for penetrating and delivering slurry into the ground and means (55) mounted on the chassis for feeding the ground injectors from a slurry supply. The feeding means comprises an annular chamber (60) having an axially positioned inlet (68) and a plurality of outlets (62) spaced around the chamber axis and connected to the respective ground injectors (39) and a diametrically extending rotary distribution valve (86) in the chamber having a throughway in communication with the inlet and an outlet orifices (90) which sweep over the chamber outlets with rotation of the valve to deliver a quantity of slurry to each outlet. The outlet orifices of the valve are diamond-shaped to co-operate with the edges of the outlets from the chamber being formed to shear through any solid material passing between the orifice and an outlet as the orifices move past the outlets to chop up such material prior to passing to said injectors.

29 Claims, 18 Drawing Sheets

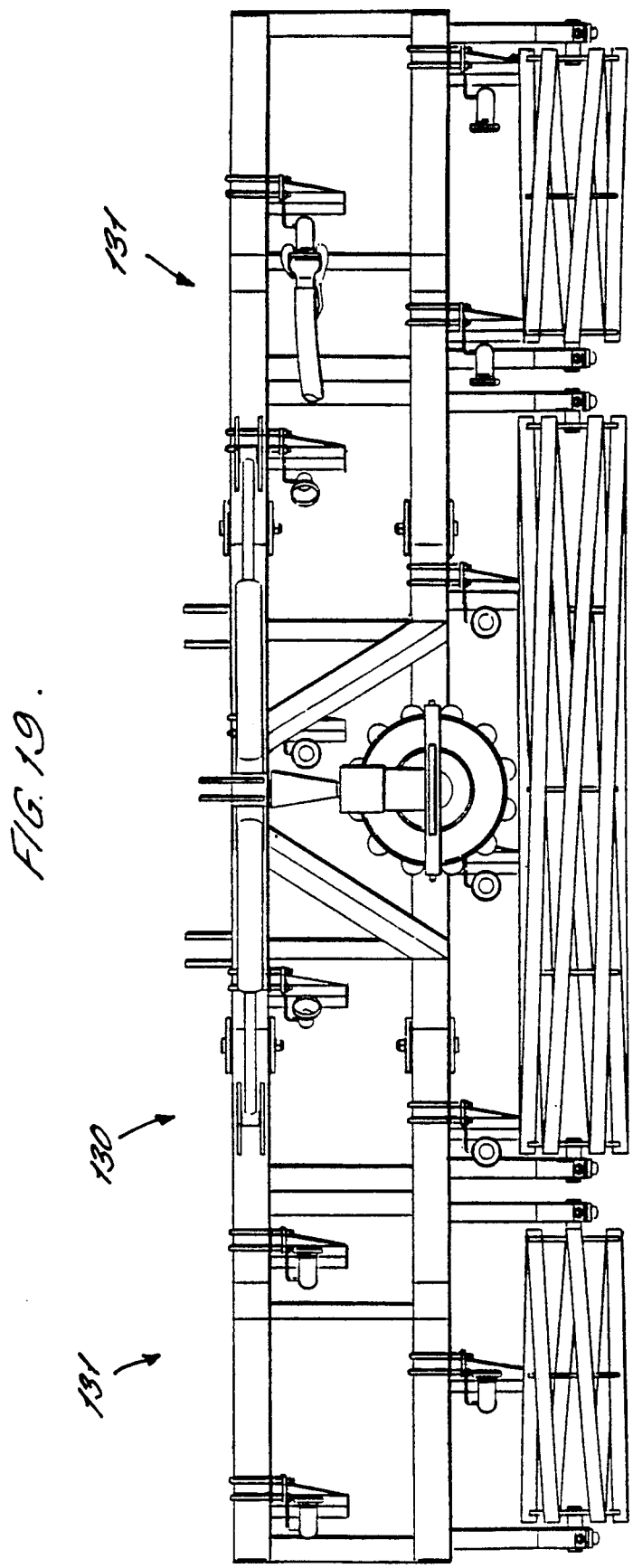

INJECTION APPARATUS FOR INJECTING SLURRIES/LIQUIDS INTO THE GROUND

BACKGROUND OF THE INVENTION

1. Field of the Invention

This invention relates to injection apparatus for injecting liquids/slurries into the ground. The liquids/slurries may include animal manure slurry, liquid blood, "stick" water which is a slurry based on fish offal, bones, shell-fish waste, seaweed with the possible addition of animal blood, rancid wine and any other liquid or slurry particularly of waste products which can be beneficially injected in the ground to enhance the growth of crops thereon.

2. Background Prior Art

One form of apparatus for injecting slurry into the ground is described and illustrated in European Patent Publication No. 0383633. This apparatus includes a device for distributing manure slurry received from a holding tank to injector nozzles comprising a chamber with an inlet port and a plurality of outlet ports, a plurality of first static cutter members fixed within the chamber and at least one blade member rotatably disclosed within the chamber to cooperate with the static members to sever solid material in the slurry passing through the distributing device. In practice the cutter members do not cut through material such as straw readily and tend to become clogged with solid material. Ultimately the chamber becomes blocked with solid material rendering the device inoperable.

SUMMARY OF THE INVENTION

The invention provides apparatus for injecting slurry/liquid into the ground comprising a chassis, a plurality of injectors mounted on the chassis for penetrating and delivering slurry into the ground and means mounted on the chassis for feeding the ground injectors from a slurry supply, said feeding means comprising an annular chamber having an axially positioned inlet, a plurality of outlets spaced around the chamber axis connected to the respective ground injectors and a rotary distribution valve in the chamber having a throughway in communication with the inlet and an outlet orifice which sweeps over the chamber outlets with rotation of the valve to deliver a quantity of slurry to each outlet, the outlet orifice of the valve and the edge of each outlet from the chamber being formed to shear through any solid material passing between the orifice and an outlet as the orifice moves past the outlet to break up such material prior to passing to said injectors.

Preferably the outlet orifice of the rotary valve tapers in the trailing direction to form a constriction in which solid material is trapped and sheared against an edge of an outlet port. More specifically the outlet orifice of the rotary valve may taper to a point in the trailing direction to form said constriction.

In one specific example the outlet orifice from the throughway in the rotary valve may be diamond-shaped with one pair of tips of the diamond-shape spaced in the direction of rotation of the valve.

The ports from the annular chamber may have parallel sides extending parallel to the axis of rotation of the valve to co-operate with the outlet orifice of the valve.

In any of the above arrangements the chamber may have an annular peripheral wall and said outlet ports may be formed in the wall at spaced locations around the wall.

In the latter arrangement the valve may extend diametrically across the annular chamber and has outlet orifices at both ends thereof to deliver slurry to the outlets from the chamber as the valve rotates within the chamber, the valve having a central axially facing opening in communication with the inlet to the chamber to receive said supply of slurry. Furthermore, the outlet orifices from the valve may be formed in the separate elements mounted at the ends of the valve.

In one specific arrangement according to the invention the separate elements in which said outlet orifices are formed may comprise inserts telescopically mounted in the ends of the valve to bear against said peripheral wall of the annular chamber as the valve rotates.

In an alternative arrangement the separate elements in which said outlet orifices are formed may comprise inserts secured in the ends of the valve to sweep closely over said annular peripheral wall of the chamber.

In any of the above arrangements a motor may be provided for driving said rotary valve. For example, the motor for the rotary valve may be a hydraulic motor.

In any of the above arrangements each injector may comprise a vertical blade shaped to penetrate the ground and having an integral vertically extending nozzle at its trailing end to deliver slurry into the ground at the lower end of the blade as the ground is opened by the blade. The blade may have laterally projecting wings at its lower end thereof to extend the cavity created by the blade laterally to receive said slurry.

A vertical rotatable disc may be mounted in front of each blade to cut a slot in the ground in front of the blade to receive the blade.

In one specific arrangement of the apparatus pairs of blades are mounted side by side on a number of independent supports mounted on said chassis.

More specifically each support may be mounted on a parallel linkage which is spring urged downwardly to engage the blades in the ground.

In the latter case means may be provided for limiting the penetration of the blades into the ground which may comprise a ground wheel mounted on the support.

Said independent supports for the pairs of blades are preferably mounted to swivel about vertical axes on the chassis to permit limited steering of the apparatus.

Pairs of angled rollers may be provided on the trailing sides of the injector blades to roll the slots created by the discs and the blades closed immediately after the injection operation.

BRIEF DESCRIPTION OF THE DRAWINGS

FIGS. 17 to 19 show a further modified form of the apparatus suitable for use on stubble.

DESCRIPTION OF THE PREFERRED EMBODIMENTS

Figure 1:
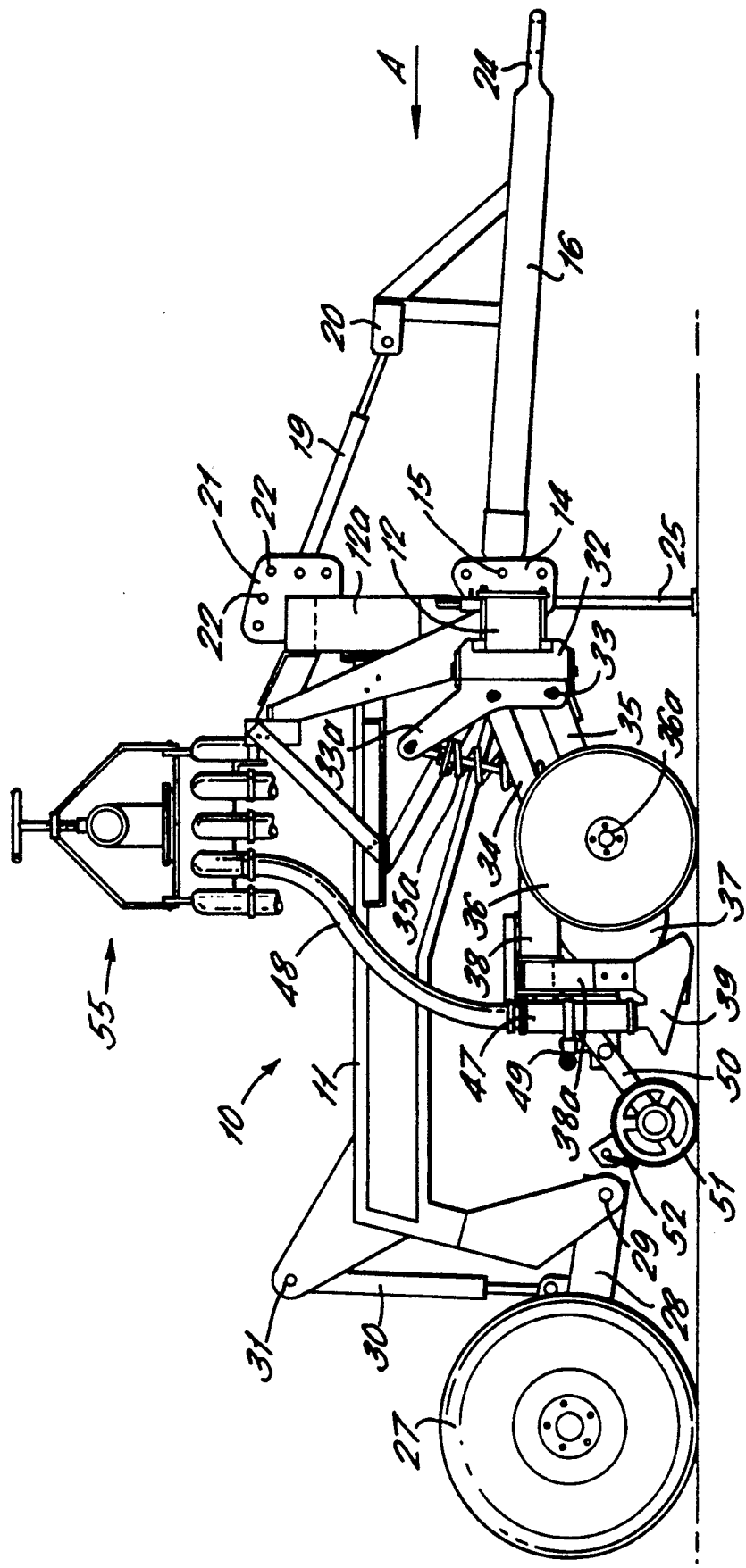
FIG. 1 is a side elevation view of tractor drawn wheel mounted apparatus for injecting animal slurry into the ground.
Figure 2:
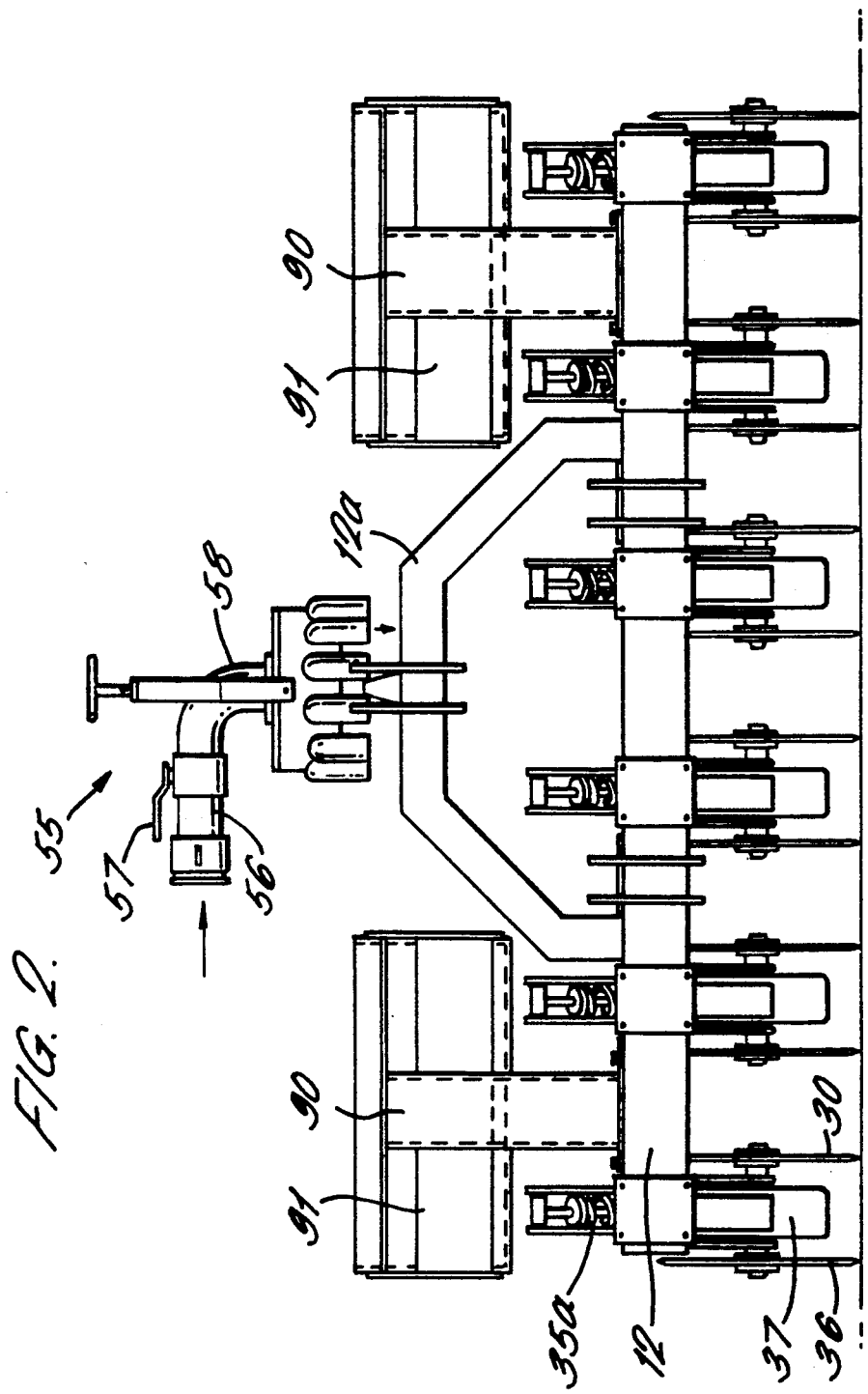
FIG. 2 is a view in the direction of the arrow A on FIG. 1.
Figure 3:
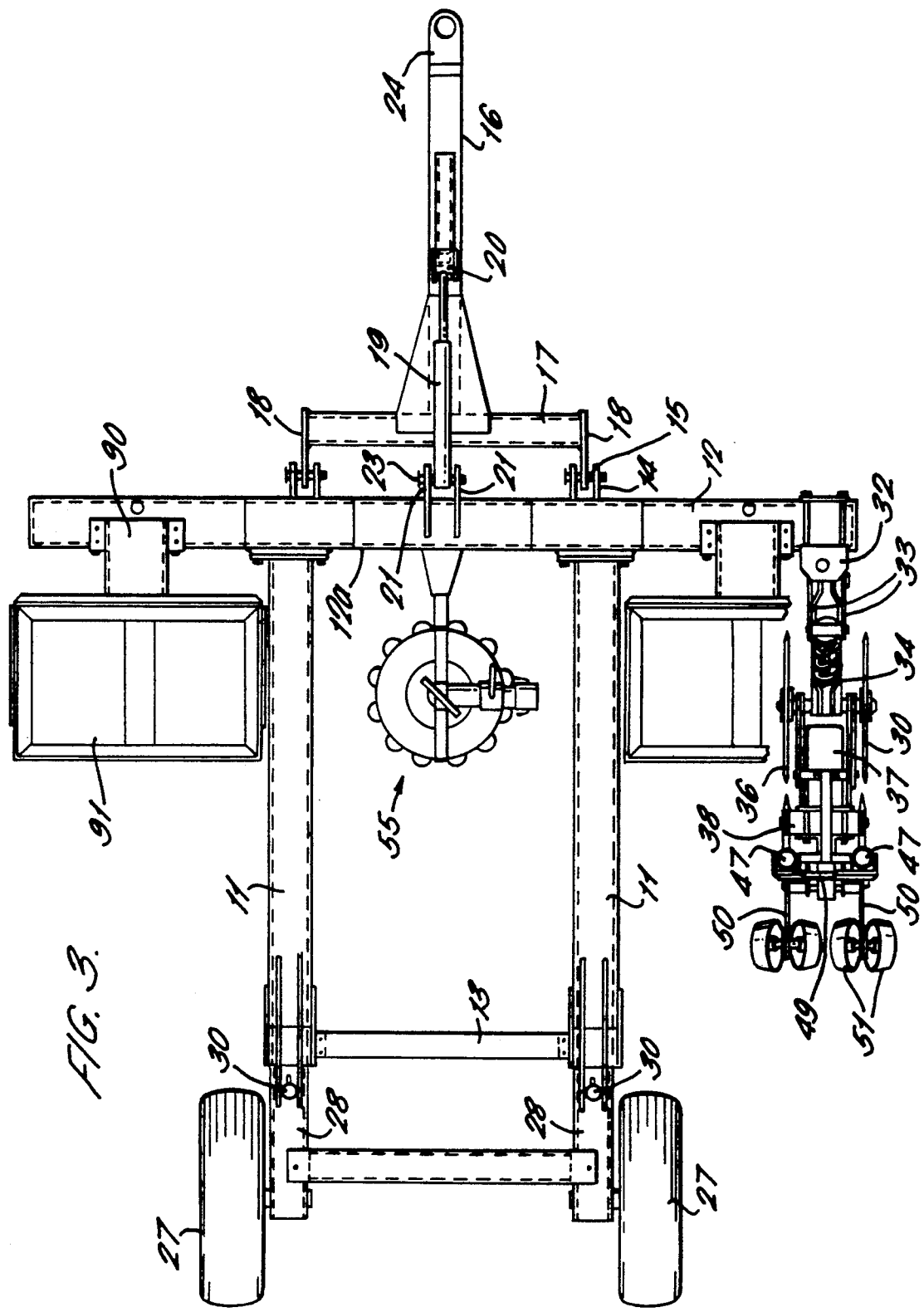
FIG. 3 is a plan view of the apparatus.

Referring firstly to FIG. 1 to 3 of the drawings, there is shown an apparatus to be towed behind a tractor for injecting animal slurry or the like into the ground. The apparatus consists of a chassis indicated generally at 10 having a pair of deep section parallel extending fore and aft members 11 connected to a cross-beam 12 at their forward ends and linked at their rearward ends by a transverse strut 13.

Two spaced pairs of lugs 14 are secured to the forward side of the cross-member 12 at spaced locations to either side of the centre line of the beam each carrying a pin 15. A tractor draw bar 16 has a transverse member 17 at its rearward end having end flanges 18 which are hinged to the pivot pins 15 so that the chassis 10 of the apparatus can be hinged about a transverse horizontal axis with respect to the draw bar 16. Adjustment about the horizontal axis provided by the pivot pins 15 is effected by means of an adjustable length strut 19 extending between a raised anchorage 20 towards the forward end of the draw bar 16 and a further pair of lugs 21 located at the centre of a raised bridge 12a mounted on the cross-member 12. The lugs 21 have a plurality of apertures 22 to receive a pin 23 for securing the strut 24 to the lugs in anyone of a number of positions of adjustment as required.

The forward end of the draw bar 16 is formed with a conventional eye 24 to engage over the hook on the tractor. Retractable jacks 25 are mounted on the cross-member 12 to support the cross-member when the apparatus is not connected to the tractor.

At the rearward end of the chassis 10, the fore and aft extending members 11 are formed with downwardly extending legs 26 and a pair of rear wheels 27 is provided for supporting the rearward end of the chassis mounted at the ends of trailing arms 28 pivoted at 29 to the lower ends of the legs. The height of the arms 28 can be varied to adjust the height of the chassis from the ground by means of a pair of hydraulic rams 30 extending between the respective arms 28 and lugs 31 secured to the chassis members 11. The hydraulic rams 30 are connectable to the hydraulic system of the tractor to be extended and retracted to raise and lower the chassis as required.

A number (in this case 6) of bearing housings 32 are mounted at equi-spaced locations along the rearward side of the cross-member 12. Each housing supports a hub (not shown) for rotation about a vertical axis. Each hub carries a pair of brackets 33 which project rearwardly of the housing 32 and to which upper and lower parallel links 34, 35 are pivoted to extend rearwardly of the bracket. The lower link 35 is downwardly biased by a coil spring 35a acting between the link and a lug 33a on bracket 33. A pair of circular discs 36 is mounted on a spindle 36a carried by the lower link to engage and cut slots in the ground. The hubs allow the link assemblies to pivot up to 20° on either side of the fore and aft direction to allow the apparatus to follow its towing tractor as it is steered around curves.

Figure 4:
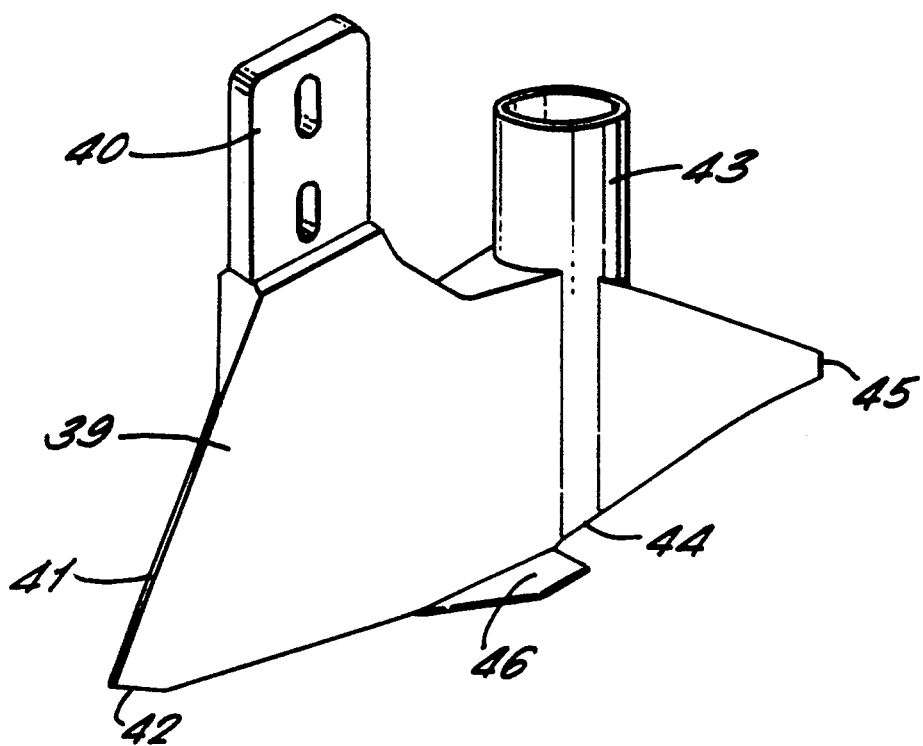
FIG. 4 is a perspective view of one of a number of blades utilised in the apparatus for penetrating and injecting slurry into the ground.

A carrier 38 is mounted towards the rearward end of the upper and lower links and pairs of narrow vertically extending ground penetrating blades 39 are mounted on the carrier spaced side by side one another and directly in line with the discs 36 to enter the slits created in the ground by the discs. One of the blades is shown in greater detail in FIG. 4 of the drawings to which reference will now be made. The blade has an upstanding lug 40 which is secured to a downwardly extending arm 38a of the carrier 38. The blade tapers towards its forward end to terminate in a leading edge 41 which is rearwardly inclined from its lower end to prevent grass and soil accumulating on it. The lower corner of the forward end of the blade is cut away as indicated at 42 to provide an inclined face to ride up over stones or other solid material in the ground to prevent damage to the blade. Towards the rearward part of the blade an injector tube 43 is embodied in the blade having an opening 44 at the lower end of the blade. Behind the injector tube 43, the blade reduces in thickness and tapers to a point 45. At the lower end of the blade immediately in front of the injector tube 43, the blade is formed with small laterally projecting wings 46 to create cavities in the ground on either side of the blade.

As indicated earlier the parallel linkages supporting each carrier are biased downwardly by springs 35a. Ground wheels 37 are mounted at the ends of the lower links 35 so that each carrier linkage follows the contour of the ground over which it is moving and the depth to which the blades 39 penetrate the ground is maintained substantially constant. The twin discs/injection blades on each carrier/linkage assembly create two injection rows or slots and so the six carriers/linkage assemblies provided across the width of the apparatus create twelve slots/rows altogether.

Short lengths of soft rubber hose 47 are connected to the injector tubes 43 of blades 39, the hoses being connected, in turn, by flexible plastics conduits 48 to a slurry distribution device 55 for supplying liquid slurry under pressure to the respective injector blades as described later. Each carrier 38 has a hydraulically operated ram controlled from the tractor for moving a pair of pipe clamps 49 for the hoses 47 in one direction to pinch and thereby close the hoses to stop flow of slurry to the injection blades. The ram operates against the action of a spring such that when the ram is de-energised, the spring releases the clamps to allow the hoses to open for supply of slurry to the blades.

At the rearward end of each carrier, pairs or rearwardly extending arms 50 are mounted on each of which a pair of outwardly splayed open spoked wheels 51 is mounted to bear on the ground on either side of the slots created by the discs/blades 39 to close the slots behind the blades back to a width of about 10 mm to reduce the loss of gases from the injected slurry to atmosphere. The arms 50 for the wheels 51 carry scrapers 52 acting on the surface of the wheels to remove soil, mud or other material adhering to the surfaces of the wheels.

The apparatus receives a supply of a liquid or slurry such as animal slurry pumped from a tank which may be towed alongside the tractor/ground injection apparatus or may be towed by one and the same tractor. The supply line is connected to a distributor device for delivering the slurry to the respective injection blade through the conduits 48 by means of a distribution device indicated generally at 55 which is mounted on the aforesaid upstanding bridge 12a on the chassis. The supply to the distribtuion device is connected to an inlet conduit 56 having a lever operated control valve for opening/closing the conduit. The inlet conduit is formed with an elbow 58 which leads to the top of the distribution device.

Figure 5:
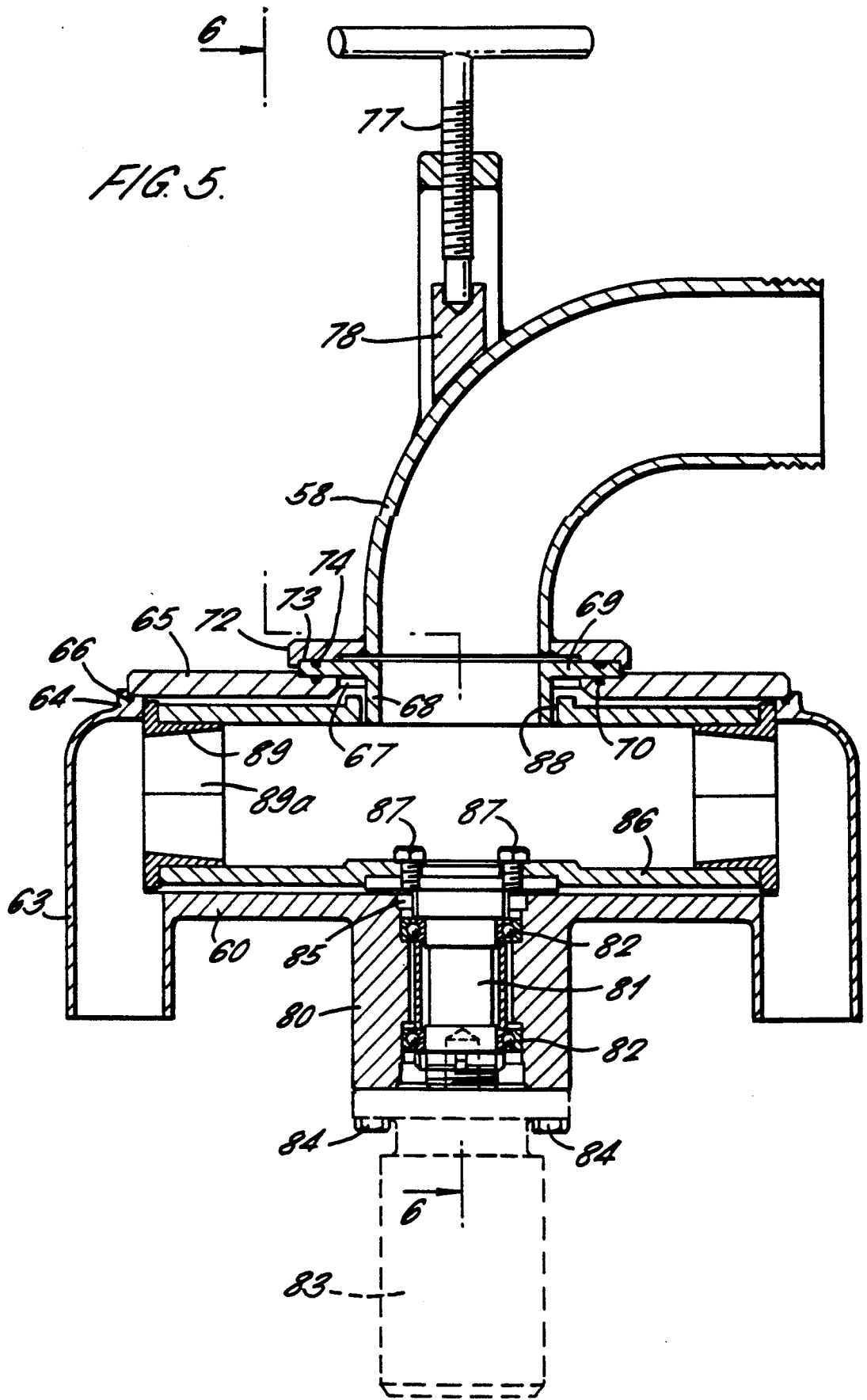
FIG. 5 is a sectional view through a device for delivering separate streams of slurry to multipule ground injector blades mounted on the chassis from a supply of slurry.
Figure 6:
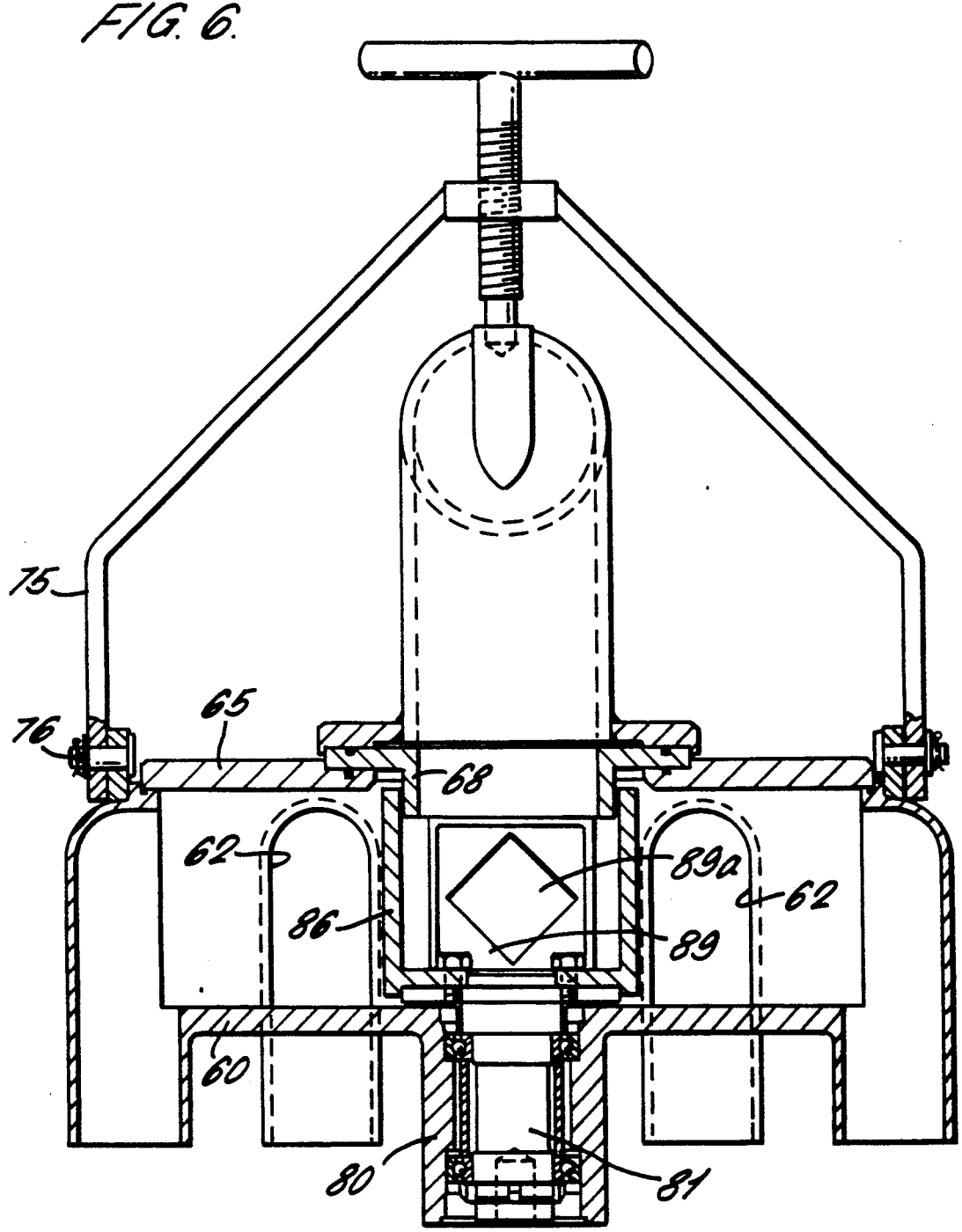
FIG. 6 is a section on line 6 on FIG. 5.
Figure 7:
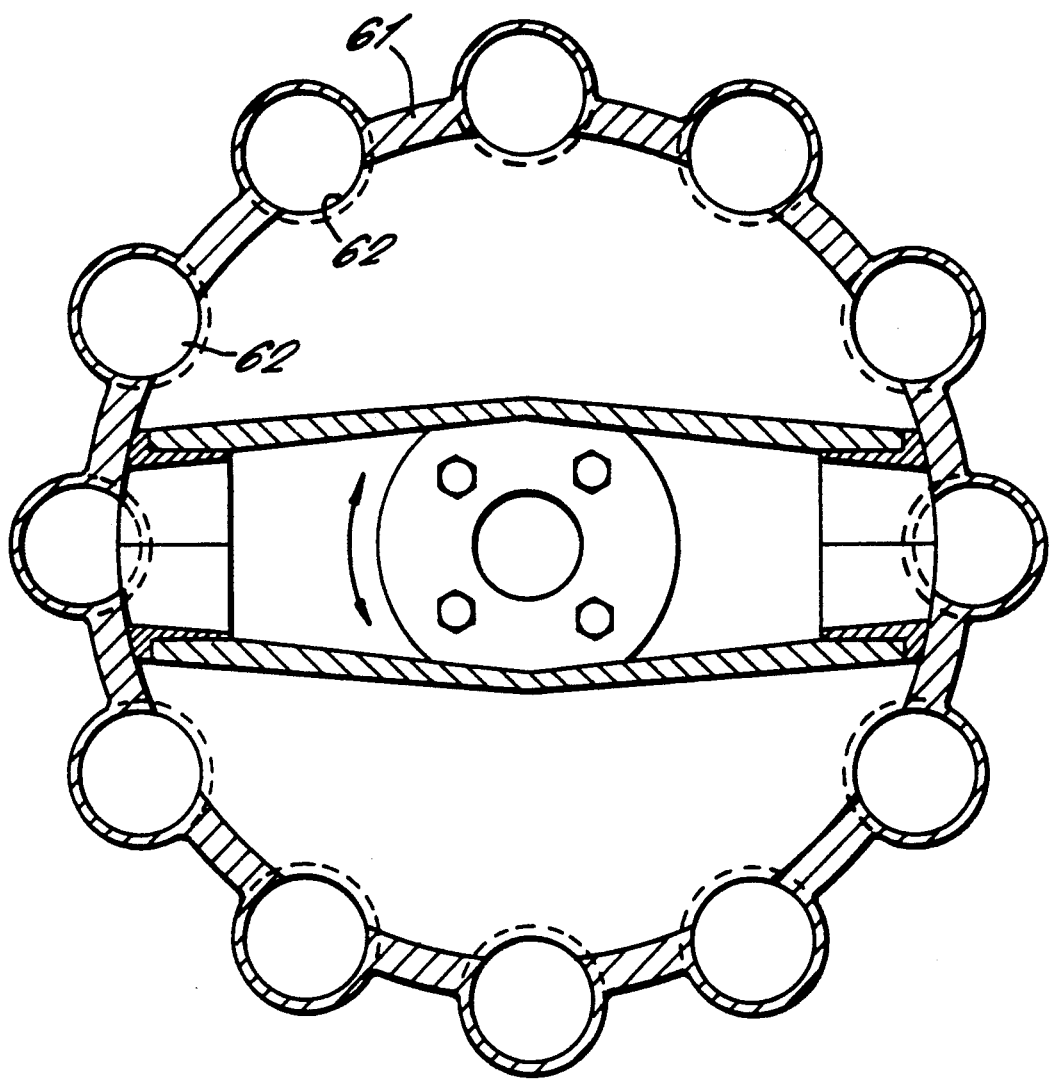
FIG. 7 is a plan view of the device of FIG. 6 with an upper part of the device removed.

A detailed description of the distribution device will now follow with reference to FIGS. 5 to 7. The device comprises a housing having a base plate 60 and an upstanding peripheral side wall 61 The peripheral wall has a number of outlet ports 62 formed at spaced locations around the wall from which integral outlet passages 63 extend downwardly and outwardly of the wall for connection to the conduits 48 leading to the injection nozzles described earlier. The device has an upstanding rim 64 around its outer periphery in which a lid 65 is fitted with a seal 66 between the lid and rim. The lid 65 has a central opening 67 in which an adaptor sleeve 68 engages having a peripheral flange 69 which overlies the inner periphery of the lid. An O-ring seal 70 is mounted in a groove in the upper periphery of the plate to seal with the overlying flange. The elbow of the inlet conduit 56 terminates in an end plate 72 which has a recess 73 to receive and engage over the flange 69. The upper side of the flange is grooved to receive an O-ring seal 74 to seal with the plate. The outlet end of the conduit 56 is thus held in axial alignment with the sleeve 68.

The lid 65 is secured to the valve body by means of a clamp having a yoke 75 hinged at 76 to the annular wall of the valve body at diametrically opposite locations across the wall with a thumb-screw 77 at the centre of the yoke which engages in a socket 78 formed on the upper side of inlet conduit 56.

The base plate 60 of the distribution device has a downwardly extending integral boss 80 in which a vertically extending shaft 81 is mounted for rotation in bearing 82. The shaft is rotated by a hydraulic drive motor 83 secured to the lower end of the boss by bolts 84. The hydraulic motor is driven by a supply of pressurised hydraulic fluid from the tractor. The upper end of the shaft 81 extends through an annular seal 85 mounted in the base plate of the valve body and a hollow diametrically extending valve member 86 is secured to the shaft by bolts 87 to be rotated thereby in the valve body. The rotary valve member 86 has a central opening 88 on the upper side thereof into which the aforesaid sleeve 68 extends with clearance to deliver slurry from the conduit 56 to the interior of the valve member.

The outer ends of the valve member extend to the inner periphery of the annular wall 61 and are fitted with bronze insert sleeves 89 which are a free-sliding fit in the ends of the valve member and which bear against the inner periphery of the annular wall 61. Each insert sleeve 89 has a diamond-shaped discharge orifice 89a as best seen in FIG. 6 of the drawings. In a further construction the insert sleeves are secured in the ends of the valve member to sweep closely over the annular wall 61 without actual metal to metal contact.

Solid material such as straw or other fibrous material in the slurry passing through the discharge outlets of the distribution device is chopped up as it passes through the device to the outlet ports. More particularly solid material is drawn into the apex of the trailing edge of each orifice, is trapped between the apex of the trailing edge and the corresponding edge of the outlet port 62 and is sheared or chopped through. The flow of liquid slurry through the discharge orifices of the rotating valve assists in clearing any solid material collecting in the corners of the orifices to ensure that the orifices and outlet ports remain clear of obstruction.

Thus a supply of slurry is delivered to each injection blade as the blades are drawn through the ground behind the tractor. The slurry permeates the ground below the blade and the cavities created on either side of the blade by the wings on the blades. Closing the ground by the action of the rollers immediately behind the blades minimises the loss of gaseous material from the slurry through the slits.

In some grounds it is necessary to weigh the apparatus downwardly to ensure that the blades penetrate the ground to the required extent and for this purpose weight carriers 90 are mounted towards either end of the beam 14 on which weights 91 are supported. Weights can be added to the carriers or removed as required to ballast the chassis of the apparatus to the required extent.

The injection apparatus is of modular construction. This allows for great flexibility of use. The machine can either be drawn behind a tractor as a wheel mounted unit (using the optional trail kit available) as described above, or can be fitted directly to the three-point linkage of either a tractor or a tanker fitted with suitable a lift-mast arrangement and therefore becomes a "one-man" operation as described below. However, this arrangement would only be used on reasonably flat terrain.

When the apparatus is used in trailer form lower horsepower is required to operte the system and work rates may be increased because fresh slurry supplies can be brought on site independently and time is not wasted in travelling to and from slurry pick-up points. The reduced power requirement allows operation in less favourable conditions. The trailed unit can be used in conjunction with an umbilical central distribution system if required.

The apparatus is designed to deposit agricultural slurry into the ground at a depth of 75 mm–100 mm, with a slot spacing of 250 mm.

Compared to:
(a) Conventional surface spreading (splash plate)
(b) "Deep injection" (200 mm or deeper)

It applies the slurry at the above depth at rates of 500 gals/acre to 4,500 gals/acre. The application rates are determined by:
(a) Inlet port size into chopper.
(b) Ground speed of unit (work rate).
(c) Consistency of slurry.

Results have shown that slurry deposited in the ground, rather than on the ground, give much greater yields to the farmer, reduce odours by some 95% and negates "run-off" into streams and water-ways. Volatilisation of ammonia is the most important aspect regarding pollution, if it can be reduced. The apparatus system reduces this ommission by approximately 95%.

It will be appreciated that many modifications may be made to the above described embodiment without departing from the scope of the invention. For example the number of nozzle carriers can be increased or reduced to vary the number of rows injected in on pass to suit the nature of the ground and the power of the tractor available.

Figure 8:
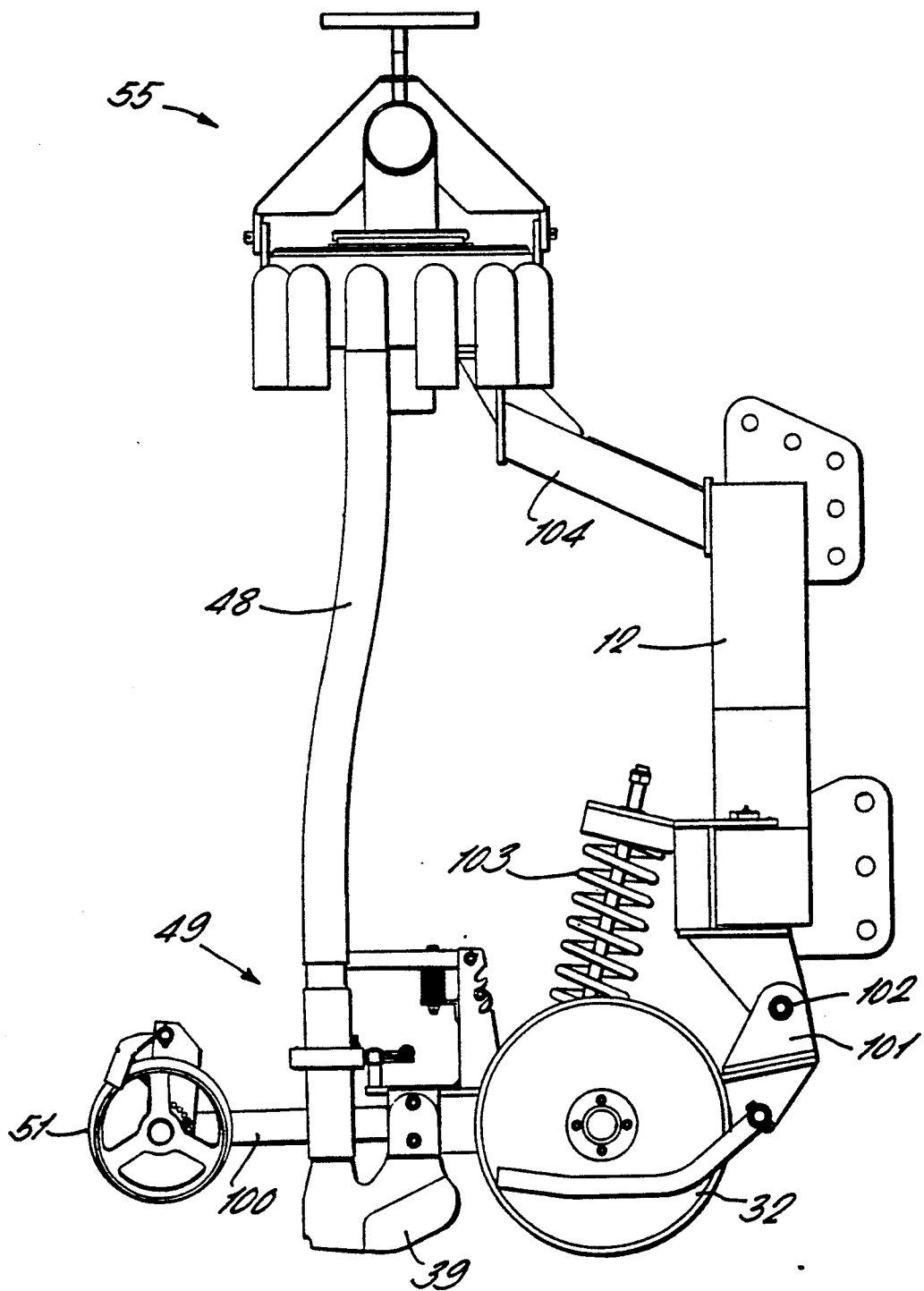
FIG. 8 is a side view of a modified form of the apparatus adapted for fitting to a three-point linkage of a tractor.
Figure 9:
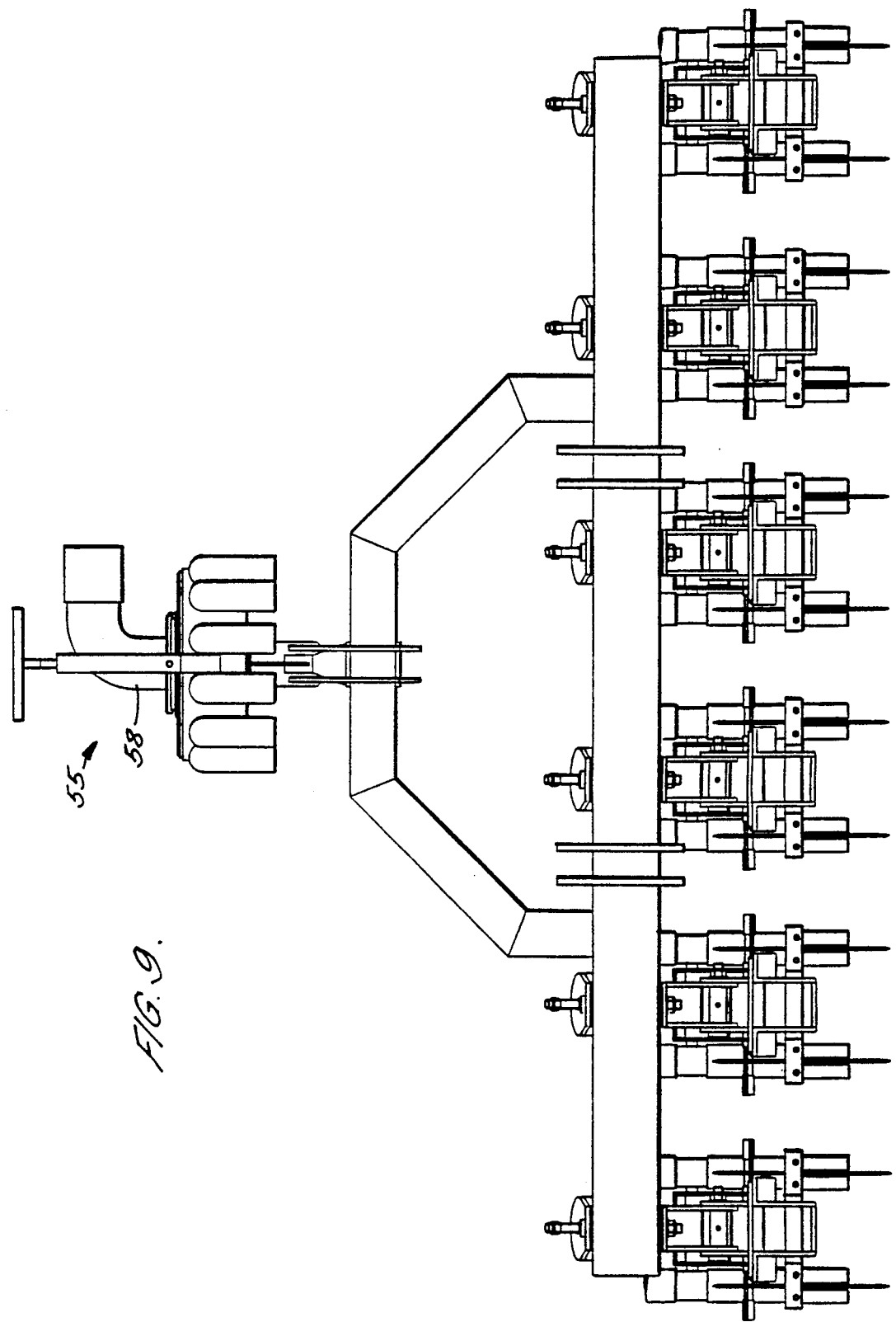
FIG. 9 is a front view of the apparatus of FIG. 8.
Figure 10:
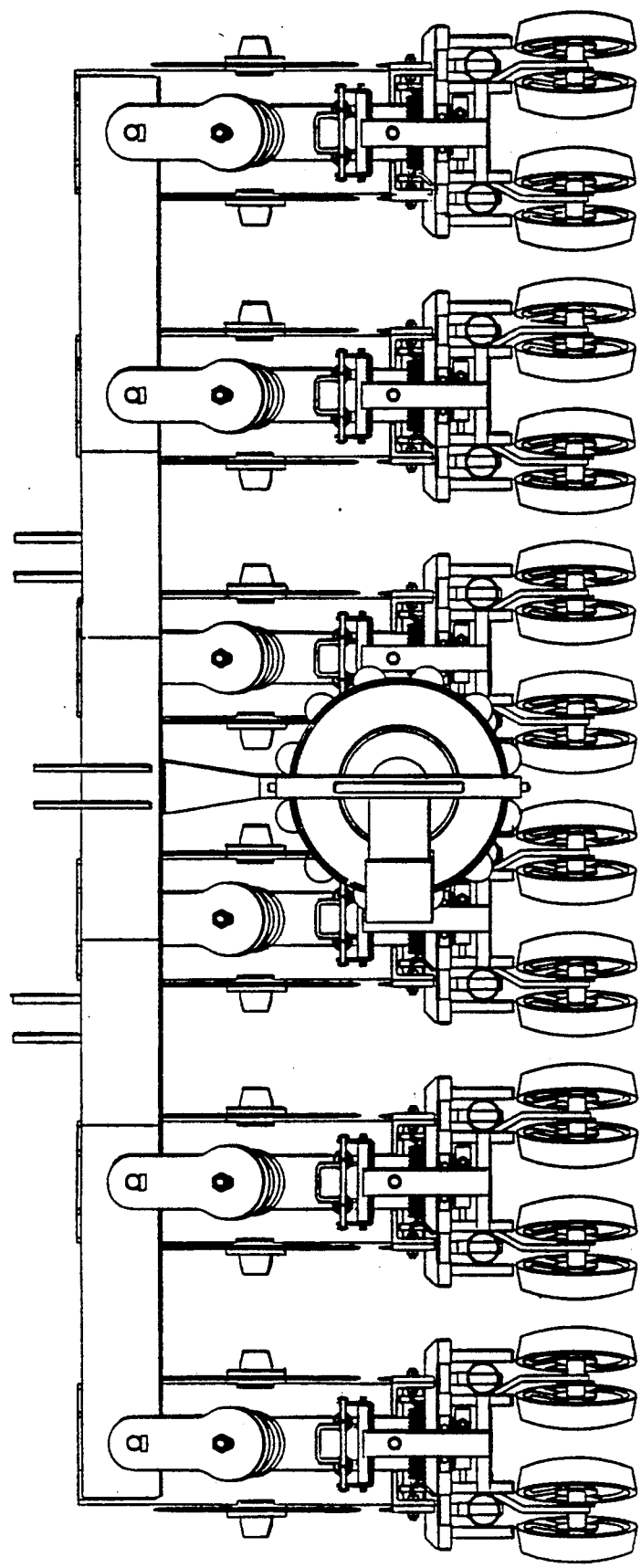
FIG. 10 is a plan view of the apparatus of FIG. 8.

Reference is now made to FIGS. 8 to 10 which show a version of the apparatus described above intended for fitting directly to a three-point linkage of a tractor. Like parts have been allotted the same reference numerals.

In the arrangement illustrated the fore and aft members 11, the trailing arms 28 mounted thereon and wheels 27 are all eliminated. The elements of the apparatus are mounted on a chassis comprising a main cross-member 12 as before but the upper and lower parallel links 34, 35 supporting the discs 36, blades 39 and wheels 51 are replaced by single side-by-side pairs of trailing links 100 pivotally supported by means of brackets 101 to the main frame member 12 at 102. Each pair of links is resiliently sprung to the frame member by pairs of spring units 103 and carries pairs of discs 32, blades 39 each with its ground injection nozzle and trailing support wheels 51 as described above. The injection nozzles of the blades 39 are fed with slurry to be injected into the ground through flexible conduits 48 from distribution device 55 mounted on rearwardly extending brackets 104 at the upper end of the cross-member 12. Flow from the conduits 48 to the blades 39 can be terminated by ram operated clamps for the hoses indicated generally at 49 as before.

Figure 11:
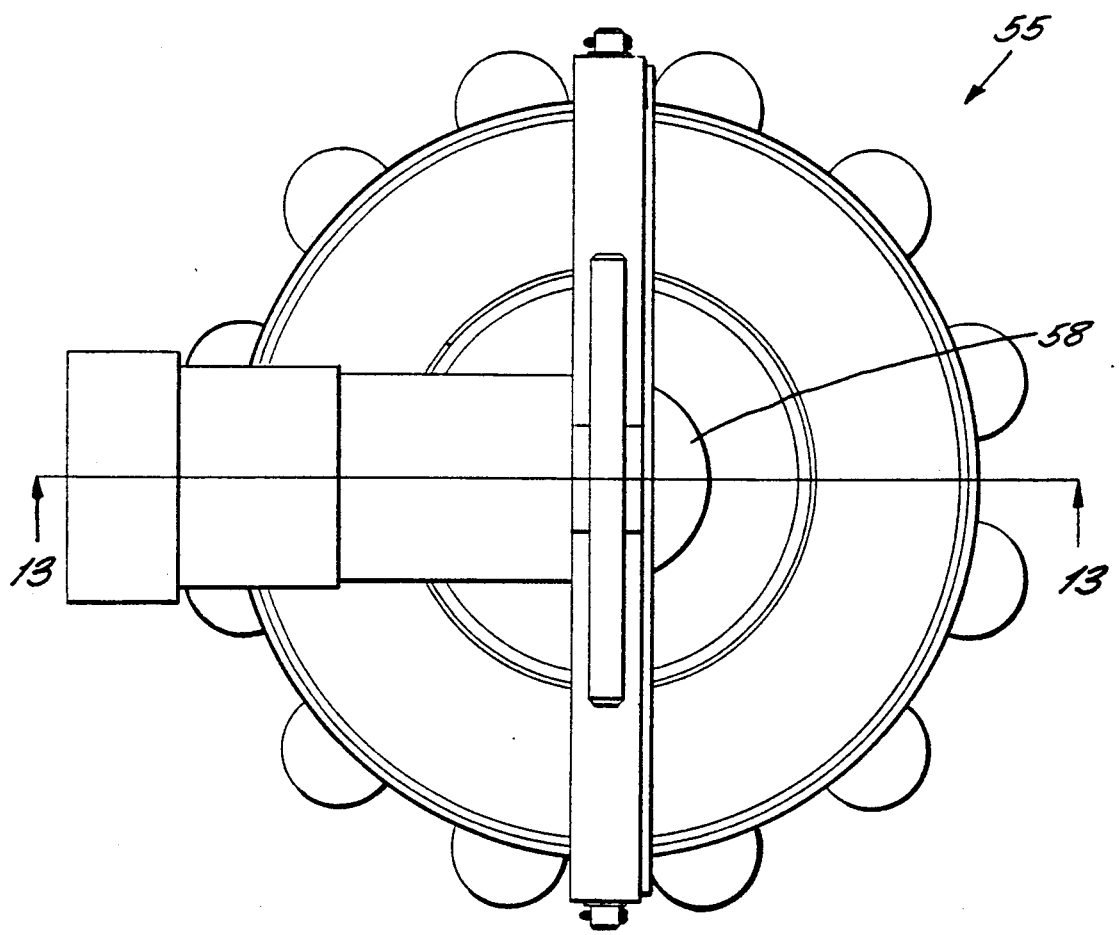
FIG. 11 is a plan view of a modified form of slurry distribution device.
Figure 12:
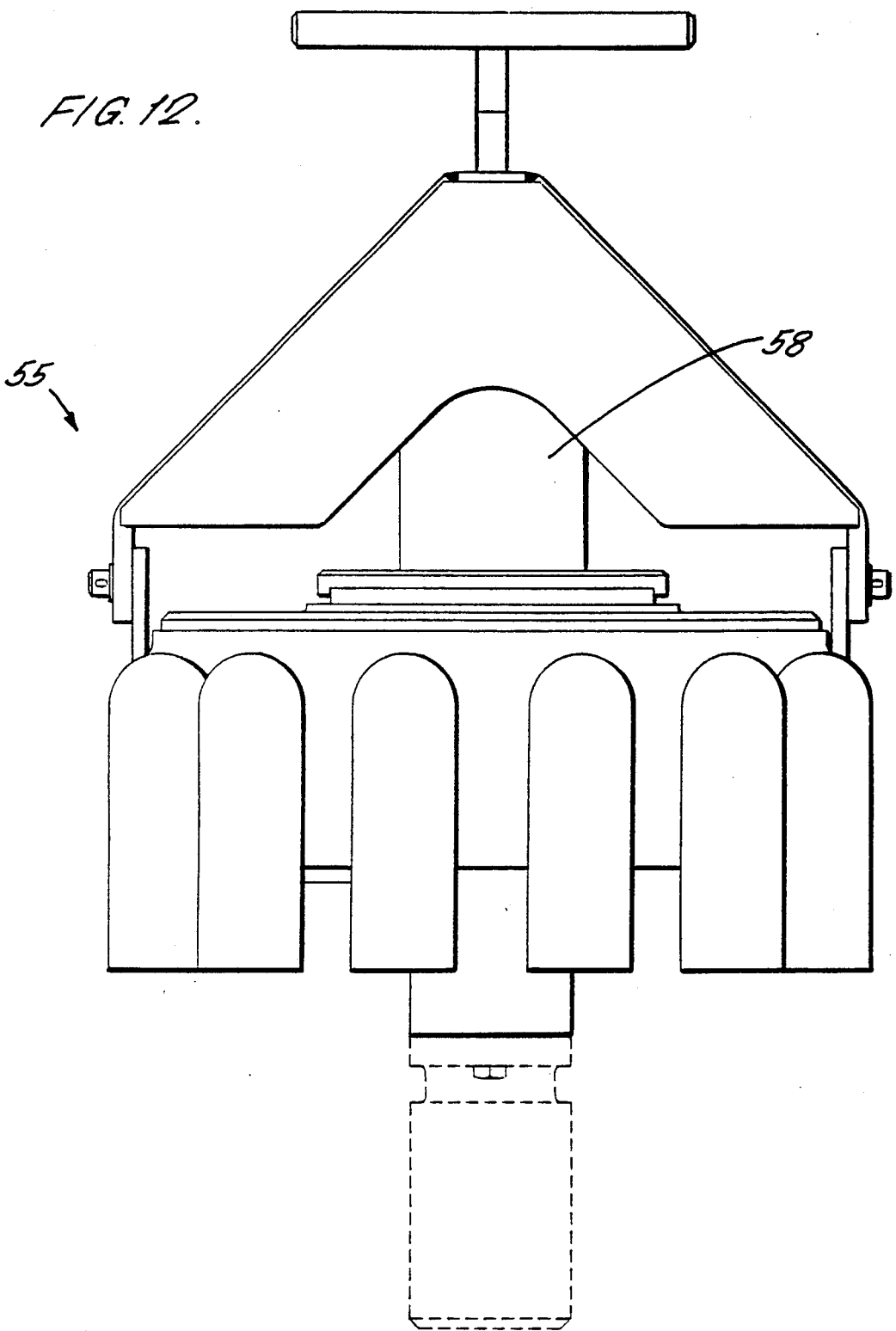
FIG. 12 is an elevation view of the modified device.
Figure 13:
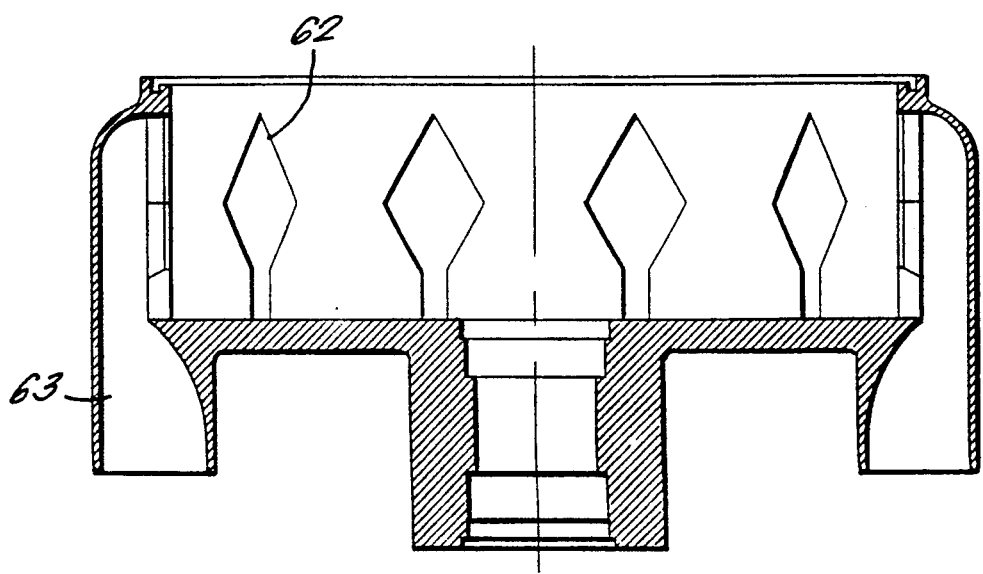
FIG. 13 is a section on the line 13—13 on FIG. 11.

Reference is now made to FIGS. 11 to 13 of the drawings which show modifications to the distribution device 55. The principal modification concerns the shaping of the outlet ports 62 in the wall of the distribution device from which the passages 63 extend for connection to the flexible conduits 48. As shown in FIG. 13, the outlet ports 62 have a diamond-form profile to cooperate with the diamond-shaped outlet ports in the rotary valve member 86 described previously to assist in chopping straw or other solid material passing, through the distribution device to prevent it from clogging the device. In addition a wear sleeve (not shown) may be fitted to the inner side of the side wall 61 of the distribution device. The sleeve would be a sliding fit within the side wall and would incorporate the diamond-shaped outlet ports presently located in the side wall.

Figure 14:
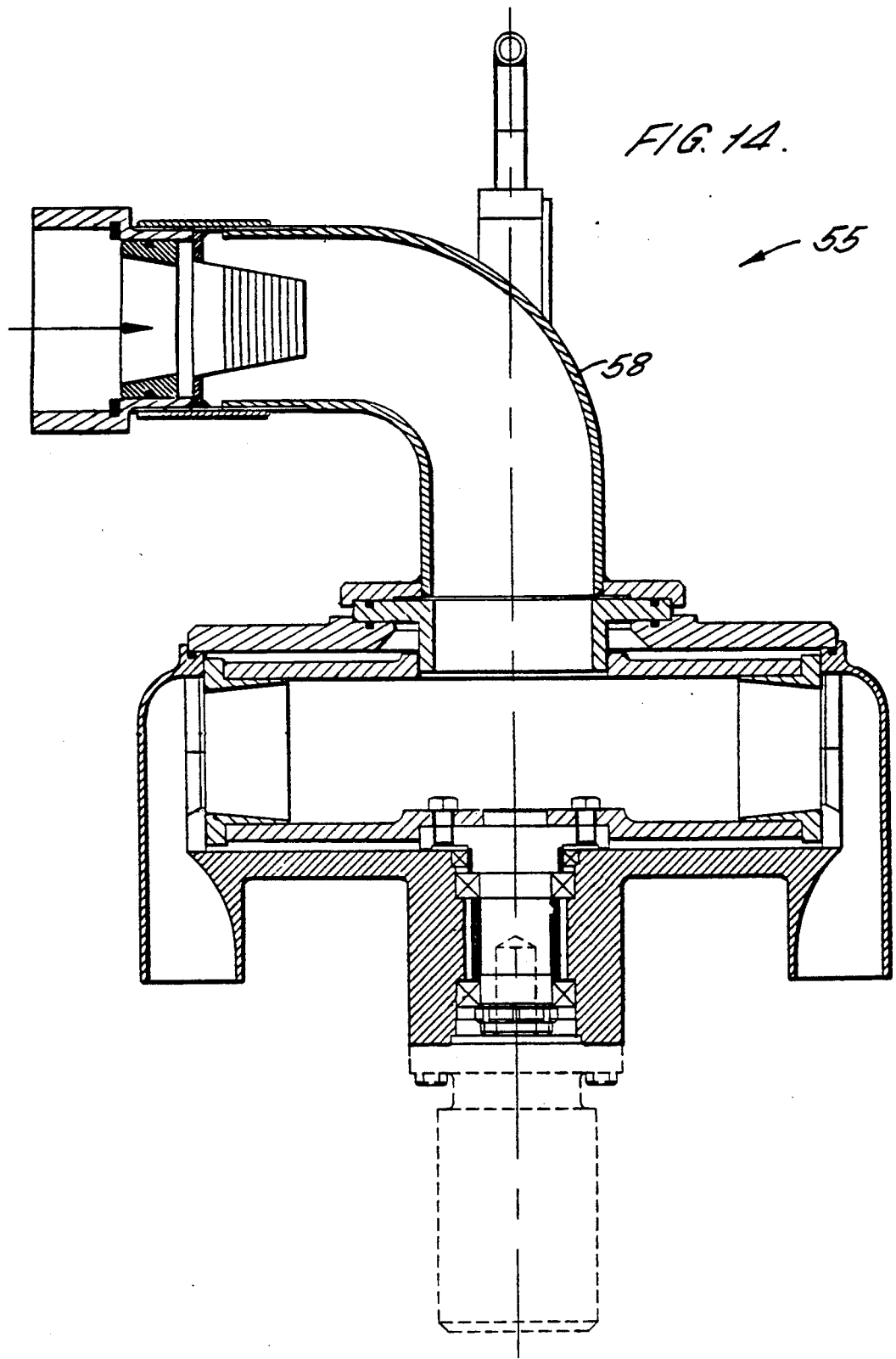
FIG. 14 is a detailed sectional view through a modified form of the slurry distribution device.
Figure 15:
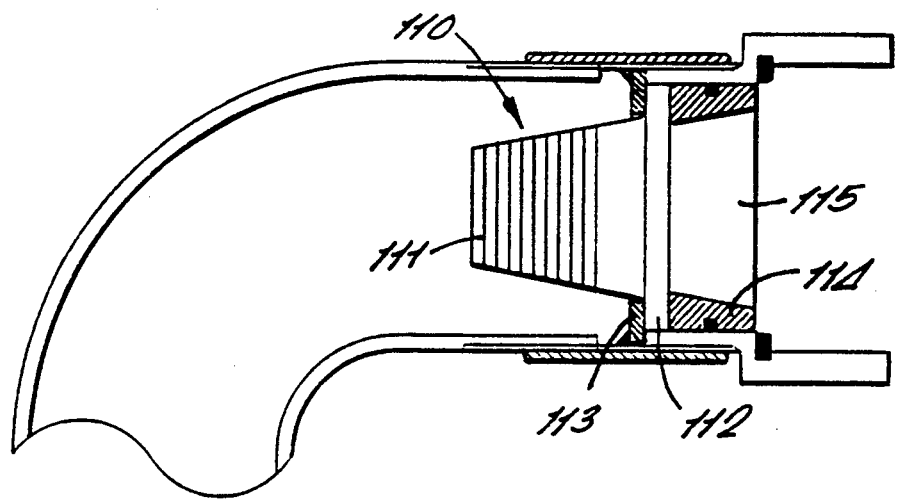
FIGS. 15 and 16 show further detailed arrangements of the distribution device.
Figure 16:
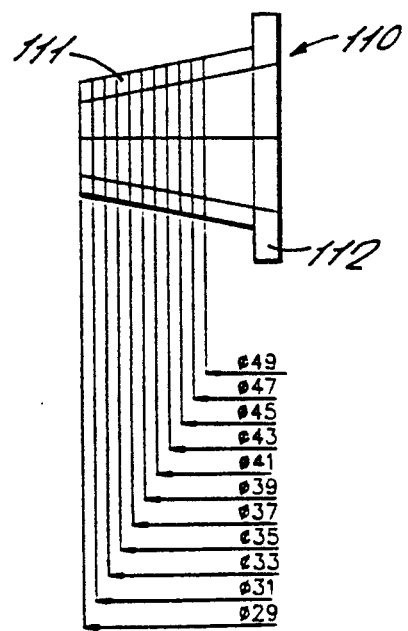

Reference is now made to FIGS. 14 to 16 which show a modification to the inlet conduit 58 to the rotary distribution device. The modification consists of a flow resistor 110 located in the conduit and comprising a tapered nozzle 111 having an encircling flange 112 at its larger end which is mounted between a flange 113 secured in the outlet and a location ring 114 having a tapered passage 115 to lead into the nozzle. The nozzle has a series of graduations along its length to define positions to which the reduced diameter end of the nozzle can be trimmed to enable different nozzle lengths to be related to flow rates through the nozzle.

Figure 17:
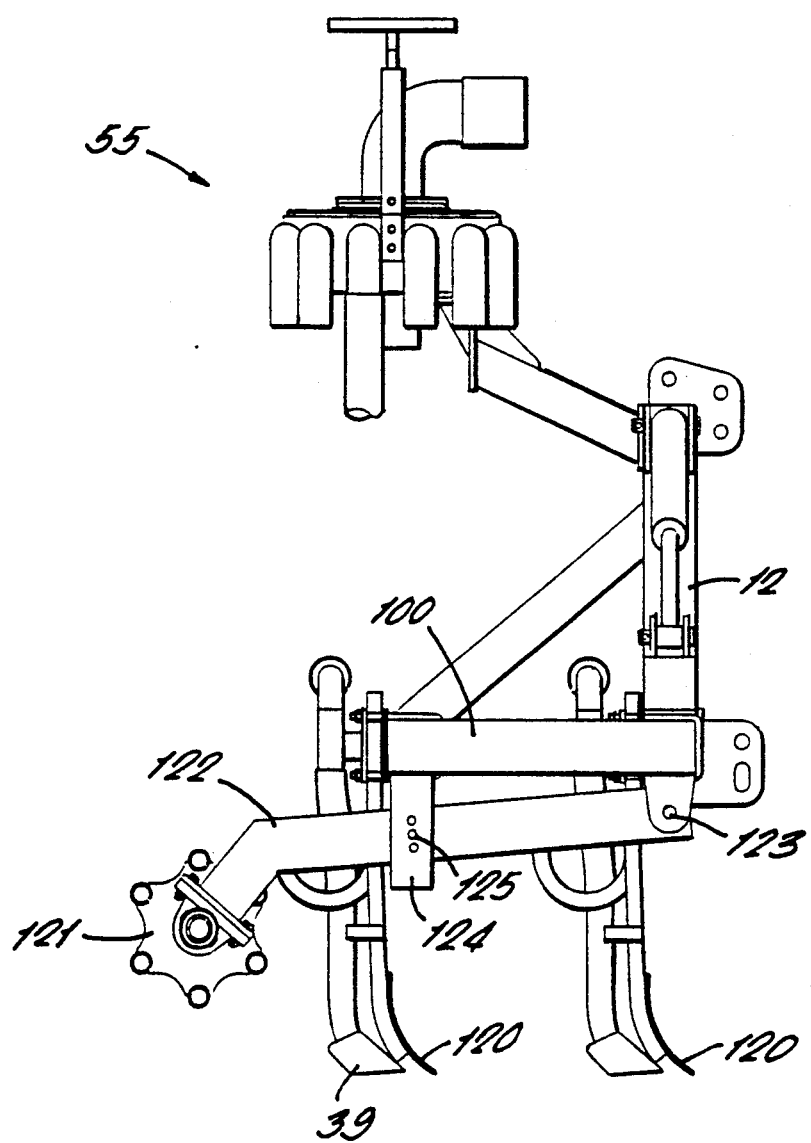
Figure 18:
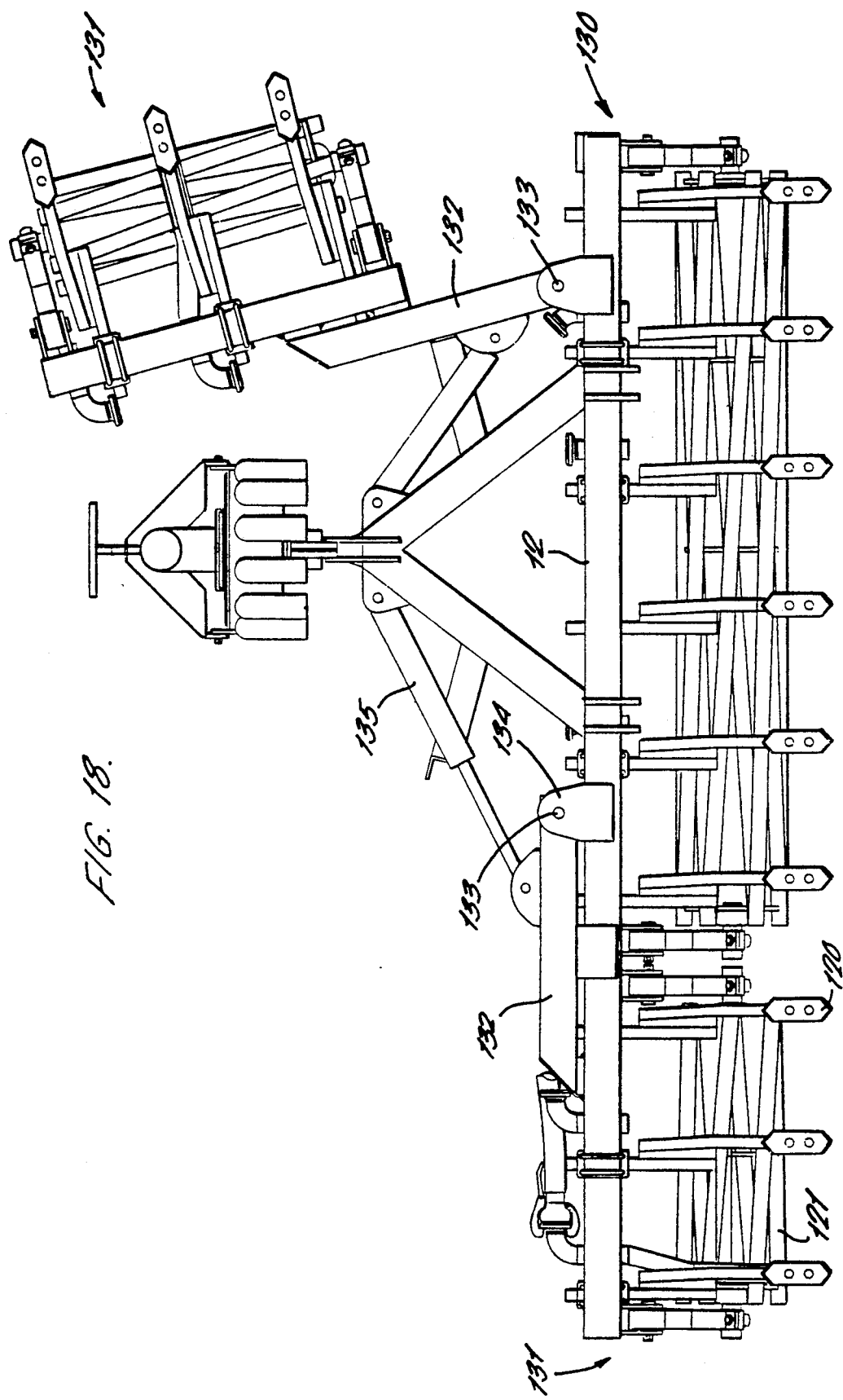

Finally FIGS. 17 to 19 show a modified form of the apparatus of FIG. 8 adapted for use on stubble on arable ground and in which the shaping of the blade 39 is modified to suit the ground and depth to which the slurry is to be injected as shown in FIG. 17. The discs 32 used in the previous arrangements are eliminated and, in their place, curved tines 120 are mounted on the leading sides of the blades 39 to open the ground to receive the blades 39. The arms 100 supporting the blades 39 are fixed to the frame 12 and the height of the apparatus moving over the ground is controlled by slatted rollers 121 mounted on trailing arms 122 secured to the frame 12. The arms 122 are pivotally connected at 123 to the frame and the height of the arms can be adjusted with respect to the fixed arms 100 carrying the blades by means of pin connections between downwardly extending lugs 124 on the members 100 and which have a plurality of vertically spaced holes 125 through which pins can be inserted to engage in corresponding holes in the arms 122.

As illustrated in FIGS. 18 and 19, the apparatus may comprise a main central section indicated at 130 with similar outer sections 131 mounted on arms 132 hinged at 133 to brackets 134 mounted on the cross-member 12 of the main section. Hydraulic rams 135 are provided for raising and lowering the outer sections as best seen in FIG. 18 to enable the outer sections to be raised into stow positions as indicated in the right-hand side of the Figure for transport for storage. The arrangements are otherwise generally similar to those described above.

We claim:

1. Apparatus for injecting slurry/liquid into the ground comprising a chassis, a plurality of injectors mounted on the chassis for penetrating and delivering slurry into the ground and means mounted on the chassis for feeding the ground injectors from a slurry supply, said feeding means comprising an annular chamber having an axially positioned inlet and a plurality of outlets spaced around the chamber axis connected to a respective ground injector and a rotary distribution valve and means to rotate the valve, said valve rotatably mounted in the chamber and having a throughway in communication with the inlet and an outlet orifice which sweeps over the chamber outlets with rotation of the valve to deliver a quantity of slurry to each outlet, the outlet orifice of the valve and the edge of each outlet from the chamber being formed to shear through any solid material passing between the orifice and an outlet as the orifice moves past the outlet to break up such material prior to passing to said injectors.

2. A ground injection apparatus as claimed in claim 1, wherein the outlet orifice of the rotary valve tapers to form a constriction in which solid material is trapped and sheared against an edge of an outlet port.

3. A ground injection apparatus as claimed in claim 2, wherein the outlet orifice of the rotary valve tapers to a point to form said constriction.

4. A ground injection apparatus as claimed in claim 3, wherein the outlet orifice from the throughway in the rotary valve is diamond-shaped with one pair of tips of the diamond-shape spaced in the direction of rotation of the valve.

5. A ground injection apparatus as claimed in claim 4, wherein the outlets from the annular chamber have parallel sides extending parallel to the axis of rotation of the valve to co-operate with the outlet orifice of the valve.

6. A ground injection apparatus as claimed in claim 1, wherein the chamber has an annular peripheral wall and, said outlet ports are formed in the wall at spaced locations around the wall.

7. A ground injection apparatus as claimed in claim 6, wherein the valve extends diametrically across the annular chamber and has outlet orifices at both ends thereof to deliver slurry to the outlets from the chamber as the valve rotates within the chamber, the valve having a central axially facing opening in communication with the inlet to the chamber to receive said supply of slurry.

8. A ground injection apparatus as claimed in claim 7, wherein the outlet orifices from the valve are formed in the separate elements mounted at the ends of the valve.

9. A ground injection apparatus as claimed in claim 8, wherein the separate elements in which said outlet orifices are formed comprise inserts telescopically mounted in the ends of the valve to bear against said peripheral wall of the annular chamber as the valve rotates.

10. A ground injection apparatus as claimed in claim 8, wherein the separate elements in which said outlet orifices are formed comprise inserts secured in the ends of the valve to sweep closely over said annular peripheral wall of the chamber.

11. A ground injection apparatus as claimed in claim 6, wherein the ports in the annular chamber are diamond-shaped in profile.

12. A ground injection apparatus as claimed in claim 1, wherein a motor is provided for driving said rotary valve.

13. A ground injection apparatus as claimed in claim 12, wherein the motor for the rotary valve is a hydraulic motor.

14. A ground injection apparatus as claimed in claim 1, wherein the chamber has an inlet conduit provided with a flow restrictor.

15. A ground injection apparatus as claimed in claim 14, wherein the flow restrictor comprises a tapered nozzle mounted in the conduit.

16. A ground injection apparatus as claimed in claim 1, wherein each injector comprises a vertical blade shaped to penetrate the ground and having an integral vertically extending nozzle at its trailing end to deliver slurry into the ground at the lower end of the blade as the ground is opened by the blade.

17. A ground injection apparatus as claimed in claim 16, wherein the blade has laterally projecting wings at its lower end thereof to extend the cavity created by the blade laterally to receive said slurry.

18. A ground injection apparatus as claimed in claim 16 wherein a vertical rotatable disc is mounted in front of each blade to cut a slot in the ground in front of the blade to receive the blade.

19. A ground injection apparatus as claimed in claim 16, wherein pairs of blades are mounted side by side on a number of independent supports mounted on said chassis and said ground injections are mounted on the respective supports.

20. A ground injection apparatus as claimed in claim 19, wherein the supports comprise trailing link means mounted on the chassis and spring urged downwardly to engage the blades in the ground.

21. A ground injection apparatus as claimed in claim 20, wherein means are provided for limiting the penetration of the blades into the ground.

22. A ground injection apparatus as claimed in claim 21, wherein the means for limiting the penetration of the blades into the ground comprise a ground wheel mounted on the support.

23. A ground injection apparatus as claimed in claim 19, wherein said independent supports for the pairs of blades are mounted to swivel about vertical axes on the chassis to permit limited steering of the apparatus.

24. A ground injection apparatus as claimed in claim 1, wherein pairs of angled rollers are provided on the trailing sides of the injector blades to roll the slots created by the discs and the blades closed immediately after the injection operation.

25. A ground injection apparatus as claimed in claim 14 and adapted for injecting slurry into arable ground carrying stubble, wherein each injector is preceded by a tine adapted to cut a groove in the ground the receive the injector.

26. A ground injection apparatus as claimed in claim 25, wherein slatted rollers are mounted behind the injector to limit penetration of the injectors into the ground.

27. A ground injection apparatus as claimed in claim 1, wherein the chassis has a tow bar at one end to engaged by a tractor and has support wheel at the other end and means are provided for raising and lowering the chassis for engagement and disengagement of the blades with the ground.

28. A ground injection apparatus as claimed in claim 27, wherein means are provided for supporting weights on the chassis to assist in biasing the chassis downwardly to engage the blade thereon in the ground.

29. A ground injection apparatus as claimed in claim 1, wherein the chassis is adapted to be mounted on a three-point linkage to be raised and lowered thereby at the rear of a tractor.

* * * * *

UNITED STATES PATENT AND TRADEMARK OFFICE
CERTIFICATE OF CORRECTION

PATENT NO. : 5,272,992

DATED : December 28, 1993

INVENTOR(S) : RICHARD S. BARBOUR, SAMUEL J. WEATHERUP

It is certified that error appears in the above-identified patent and that said Letters Patent is hereby corrected as shown below:

Col. 7, line 39, delete "passing,", insert --passing--

Col. 8, line 59, delete "and,", insert --and

Signed and Sealed this

Twenty-fourth Day of May, 1994

Attest:

BRUCE LEHMAN

*Attesting Officer*     *Commissioner of Patents and Trademarks*